No. 897,182. PATENTED AUG. 25, 1908.
W. E. WILLIAMS.
SHREDDED WHEAT BISCUIT.
APPLICATION FILED JAN. 29, 1908.
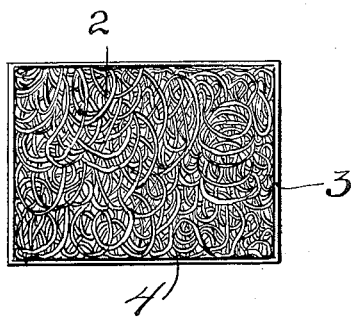
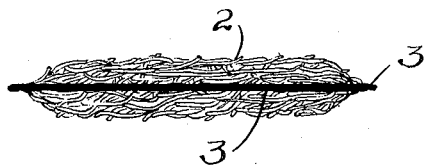

UNITED STATES PATENT OFFICE.

WILLIAM ERASTUS WILLIAMS, OF CHICAGO, ILLINOIS.

SHREDDED-WHEAT BISCUIT.

No. 897,182.  Specification of Letters Patent.  Patented Aug. 25, 1908.

Application filed January 29, 1908. Serial No. 413,280.

*To all whom it may concern:*

Be it known that I, WILLIAM E. WILLIAMS, a citizen of the United States, residing at Chicago, county of Cook, State of Illinois, have invented new and useful Improvements in Shredded-Wheat Biscuits, of which the following is a specification.

The object of my invention is to produce a preferably flat shredded wheat biscuit which, instead of being compact, dense and harsh, as some have been made in order that they may bear handling and shipping, shall be of loose or open texture, crisp, and fragile and yet capable of withstanding the rough treatment just mentioned. Children, especially, almost invariably dislike the compact biscuits mentioned, while they are usually especially fond of the fragile products made in accordance with this invention.

In the accompanying drawings: Figure 1 is a plan view of one form of the novel biscuit. Fig. 2 is an edge view of the same.

The body 2 of the biscuit consists of a preferably flat mass of variously curved, overlapped and interlaced cereal shreds, and surrounding this body is a narrow, relatively thin, continuous strip 3, 4 of the same material as the shreds and integrally connected along its inner edge with the central mass of shreds, from which it is in fact usually formed as hereinafter stated. The strips form a sort of frame, preferably in the medial plane of the biscuit, as shown, and when the biscuit is baked this strip or rib though brittle becomes rigid enough to support and protect the more fragile shreds.

The biscuits may be formed in any suitable way, but I prefer to make them by first forming a relatively wide, flat sheet of open texture made up of variously curved, interlaced and overlapped shreds in a more or less plastic condition, and then compressing narrow bands, of the material forming the sheet, along intersecting lines, preferably at right angles, and dividing these bands longitudinally. In those portions of the fibrous sheet which are compressed to form the bands, the shreds lose their individuality and become a thin, practically homogeneous ribbon. The sheet is thus divided into biscuits like that shown in the drawings, each consisting of a comparatively loose or open mass entirely surrounded by an integral, narrow, thin, relatively compact and dense projecting rib or frame which when dried or baked protects the body, although it forms but a small fraction of the entire biscuit.

What I claim is:

1. A biscuit composed of a mass of loosely interlaced and overlapped shreds integrally united around its entire margin by a narrow compact mass of the same material.

2. An approximately flat biscuit composed of a body of curved, interlaced and overlapped shreds, forming a loose or open mass, integrally connected on all sides with a narrow compact frame, of the same material, in the medial plane of the biscuit, protecting the same in handling and during transportation.

In witness hereof I have hereunto subscribed my name on this 24th day of January, 1908, in the presence of two subscribing witnesses.

WILLIAM ERASTUS WILLIAMS.

Witnesses:
J. A. LA BREE,
R. ROPER.